(12) United States Patent
Karode

(10) Patent No.: US 12,344,806 B2
(45) Date of Patent: Jul. 1, 2025

(54) SYSTEM AND METHOD FOR RECOVERY OF FUEL GAS FROM CRUDE OIL PURIFICATION

(71) Applicant: Air Liquide Advanced Technologies U.S. LLC, Houston, TX (US)

(72) Inventor: Sandeep Karode, Boothwyn, PA (US)

(73) Assignee: Air Liquide Advanced Technologies U.S. LLC, Houston, TX (US)

( * ) Notice: Subject to any disclaimer, the term of this patent is extended or adjusted under 35 U.S.C. 154(b) by 366 days.

(21) Appl. No.: 17/949,515

(22) Filed: Sep. 21, 2022

(65) Prior Publication Data

US 2024/0093108 A1 Mar. 21, 2024

(51) Int. Cl.
| | | |
|---|---|---|
| C10L 3/10 | (2006.01) | |
| B01D 19/00 | (2006.01) | |
| B01D 53/22 | (2006.01) | |
| B01D 53/26 | (2006.01) | |
| B01D 53/28 | (2006.01) | |
| B01D 53/52 | (2006.01) | |
| B01D 53/62 | (2006.01) | |
| B01D 53/72 | (2006.01) | |

(52) U.S. Cl.
CPC .......... *C10L 3/104* (2013.01); *B01D 19/0031* (2013.01); *B01D 19/0068* (2013.01); *B01D 53/226* (2013.01); *B01D 53/227* (2013.01); *B01D 53/229* (2013.01); *B01D 53/261* (2013.01); *B01D 53/263* (2013.01); *B01D 53/268* (2013.01); *B01D 53/28* (2013.01); *B01D 53/52* (2013.01); *B01D 53/62* (2013.01); *B01D 53/72* (2013.01); *C10L 3/103* (2013.01); *C10L 3/106* (2013.01); *B01D 2252/2026* (2013.01); *B01D 2253/116* (2013.01); *C10L 2290/08* (2013.01); *C10L 2290/548* (2013.01)

(58) Field of Classification Search
None
See application file for complete search history.

(56) References Cited

U.S. PATENT DOCUMENTS

| | | | |
|---|---|---|---|
| 3,870,481 A | 3/1975 | Hegarty | |
| 5,769,926 A * | 6/1998 | Lokhandwala | B01D 53/229 585/818 |
| 6,053,965 A | 4/2000 | Lokhandwala | |
| 6,648,944 B1 | 11/2003 | Baker et al. | |
| 10,874,979 B2 | 12/2020 | Ding et al. | |

(Continued)

OTHER PUBLICATIONS

International Search Report and Written Opinion for corresponding PCT/US2023/033325, Feb. 2, 2024.

(Continued)

*Primary Examiner* — Jason M Greene
(74) *Attorney, Agent, or Firm* — Allen E. White; Christopher J. Cronin

(57) ABSTRACT

In a crude oil purification process including phase separators, a vapor recovery unit (VRU), and dew pointing/dehydration and $CO_2$ removal membranes, instead of compressing the low boiling point (i.e., $C_{1-5}$) hydrocarbon vapor stream from the VRU along with the main portion of gas from the separation train and feeding it to the membranes, it is compressed and dehydrated along with the $H_2O/C_{3+}$ hydrocarbon enriched permeate from the dew pointing and dehydration membranes.

10 Claims, 1 Drawing Sheet

(56) References Cited

U.S. PATENT DOCUMENTS

| | | |
|---|---|---|
| 2015/0021235 A1 | 1/2015 | Eriksen |
| 2017/0157557 A1* | 6/2017 | Ding .................... B01D 53/268 |
| 2019/0105601 A1* | 4/2019 | Chinn .................. B01D 53/229 |
| 2021/0214626 A1 | 7/2021 | Kezirian |
| 2022/0380687 A1 | 12/2022 | Soliman |

OTHER PUBLICATIONS

Allahyarzadeh-Bidgoli, "FPSO fuel consumption and hydrocarbon liquids recovery optimization over the lifetime of a deep-water oil field," Energy 181 (2019) pp. 927-942.

Sanchez, et al, "Energy and Exergy Performance of Three FPSO Operational Modes," Conference Paper, 23rd ABCM International Congress of Mechanical Engineering, Dec. 6-11, 2015, Rio de Janeiro, RJ, Brazil, 9 pgs.

* cited by examiner

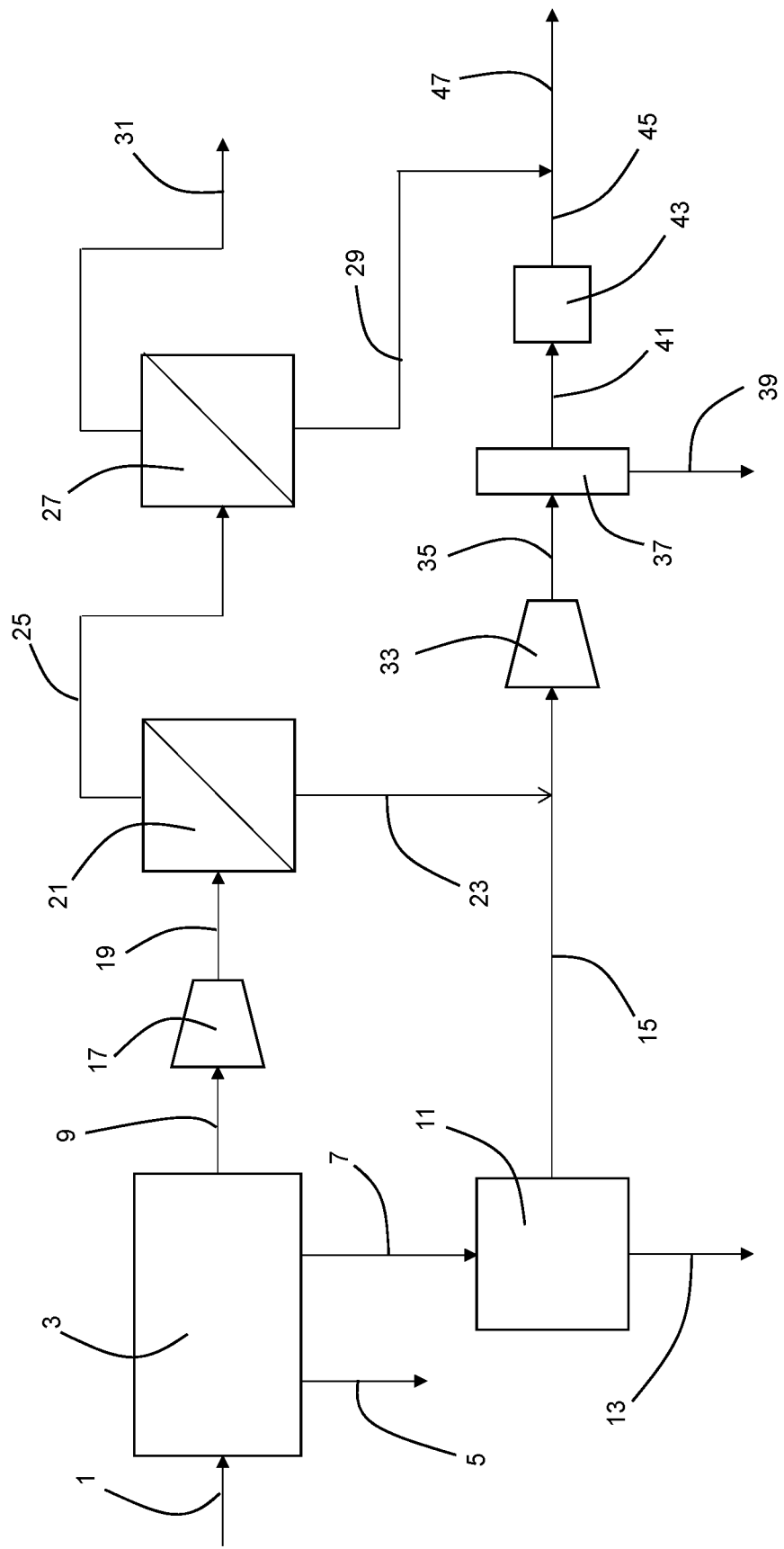

SYSTEM AND METHOD FOR RECOVERY OF FUEL GAS FROM CRUDE OIL PURIFICATION

CROSS-REFERENCE TO RELATED APPLICATIONS

None.

BACKGROUND

Field of the Invention

The present invention relates to the separation of crude oil into water, oil, and hydrocarbon-containing gas, including purification of the hydrocarbon-containing gas for recovery of fuel gas.

Related Art

In crude oil purification processes, such as aboard Floating Production Storage and Offloading (FPSO) vessels, the crude oil is initially separated, in one or more steps, into several fractions, including a gas stream, a water stream, an oil stream. The intermediate oil stream is subsequently subjected to one or more depressurization steps in a Vapor Recovery Unit (VRU) in order to release amounts of hydrocarbon gases dissolved in the oil's liquid phase and produce a vapor stream. In order to recover valuable amounts of methane, the main gas stream and the vapor stream are conventionally compressed in a main compressor, subjected to a hydrocarbon dew pointing and dehydration process and subsequently fed to a $CO_2$ removal process using, for example, gas separation membranes. The methane-enriched retentate produced by the gas separation membranes may then be exported as natural gas or used as onsite fuel gas for generators used in the overall crude oil purification process. The $CO_2$-enriched permeate produced by the gas separation membranes may then be injected back into the oil formation.

In one major improvement of such a conventional process, instead of separate dehydration, hydrocarbon dew-pointing, and $CO_2$-removal processes, the compressed stream of gas comprised of the main gas and vapor stream is subjected to the two-stage gas separation membrane process disclosed by U.S. Pat. No. 10,874,979 B2. The first stage produces a $C_{3+}$ hydrocarbon and water enriched permeate and a methane-enriched retentate. The second stage produces a dry, $CO_2$-enriched permeate, and a methane-enriched retentate suitable for export as natural gas or use as an onsite fuel gas for generators. The $C_{3+}$ hydrocarbon and water enriched permeate is compressed and fed to a separator for separation of condensed water and remaining gas. The overhead gas is then fed to a dehydration apparatus, such as a molecular sieve or gas separation membrane. The resultant dry, waste gas is combined with the $CO_2$-enriched permeate from the second stage and injected back into the oil formation.

While the process disclosed by U.S. Pat. No. 10,874,979 B2 minimizes the footprint of the dehydration apparatus in comparison to the aforementioned conventional process and is quite advantageous in comparison to the conventional process, those skilled in the art will recognize that further improvements may be possible.

SUMMARY

There is disclosed a system for recovery of fuel gas from purification of crude oil, comprising: a crude oil separation train comprising, in flow order: i) one or more phase separators in series that are adapted and configured to separate a stream of crude oil into a stream of main gas comprising methane, $H_2S$, and $CO_2$, a water stream, and a stream of non-stabilized unrefined oil containing dissolved $C_{1-5}$ hydrocarbons, and ii) a vapor recovery unit adapted and configured to depressurize and separate the stream of non-stabilized unrefined oil into a stream of stabilized unrefined oil and a vapor stream comprising $C_{1-5}$ hydrocarbons; a main compressor in downstream flow communication with the train and being adapted and configured to receive and compress the stream of main gas but not the vapor stream to produce a compressed feed gas; a first gas separation membrane-based purification stage comprising gas separation membrane modules in parallel and/or in series each of which comprises a gas separation membrane that is selective for $C_{3+}$ hydrocarbons and water over methane, the first stage being adapted and configured to receive and separate the compressed feed gas into a first permeate gas enriched in methane in comparison to the compressed feed gas and a first retentate gas enriched in $C_{3+}$ hydrocarbons and water in comparison to the compressed feed gas; a second gas separation membrane-based purification stage comprising gas separation membrane modules in parallel and/or in series each of which comprises a gas separation membrane that is selective for $CO_2$ over methane, said second stage being adapted and configured to receive and separate the first retentate gas into a second permeate gas and a second retentate gas; a fuel gas feed conduit adapted and configured to receive and feed the second retentate gas to a point of use; a secondary compressor adapted and configured to receive and compress the first permeate gas stream along with the vapor stream to produce a biphasic stream of injectate comprising $C_{3+}$ hydrocarbons enriched gas and condensed water; a phase separator adapted and configured to receive and separate the biphasic stream of injectate into a stream of condensed water and a stream of $C_{3+}$ enriched gas; and a dehydration apparatus adapted and configured to remove amounts of water from the stream of $C_{3+}$ hydrocarbons enriched gas to produce a stream of dry injectate gas, the dehydration apparatus comprising a molecular sieve or a gas separation membrane selective for water over $C_{3+}$ hydrocarbons.

There is also disclosed a method for recovery of fuel gas from purification of crude oil that includes the following steps. A crude oil separation train is provided that comprises, in flow order, one or more phase separators in series and a vapor recovery unit; a stream of crude oil is separated with the one or more phase separators into a stream of main gas comprising methane, $H_2S$, and $CO_2$, a stream of water, and a stream of non-stabilized unrefined oil containing dissolved $C_{1-5}$ hydrocarbons. The stream of non-stabilized unrefined oil is depressurized and separated, with the vapor recovery unit, into a stream of stabilized unrefined oil and a vapor stream comprising $C_{1-5}$ hydrocarbons. The stream of main gas, but not the vapor stream, is compressed to produce a compressed feed gas. The compressed feed gas is separated, with a first gas separation membrane-based purification stage comprising gas separation membrane modules in parallel and/or in series each of which comprises a gas separation membrane that is selective for $C_{3+}$ hydrocarbons and water over methane, into a first permeate gas stream enriched in methane in comparison to the compressed feed gas and a first retentate gas stream enriched in $C_{3+}$ hydrocarbons and water in comparison to the compressed feed gas. The first retentate stream is separated, with a second gas separation membrane-based purification stage comprising gas separation membrane modules in parallel and/or in series each of which comprises a gas separation membrane that is selective for $CO_2$ over methane, into a second permeate gas stream and a second retentate gas stream. The second retentate gas is fed, with a fuel gas feed conduit, to a point of use. The first permeate gas stream is compressed, with a secondary compressor, along with the vapor stream to produce a biphasic stream of injectate comprising $C_{3+}$ enriched gas and condensed water. The biphasic stream of injectate is separated, with a phase separator adapted and configured to receive and separate the biphasic stream of injectate, into a stream of condensed water and a stream of $C_{3+}$ enriched gas. Amounts of water are removed from the stream of $C_{3+}$ hydrocarbons enriched gas with a dehydration apparatus to produce a stream of dry injectate gas, the dehydration apparatus comprising a molecular sieve, a gas separation membrane selective for water over $C_{3+}$ hydrocarbons, or a triethylene glycol dehydration system.

The system and/or method may include one or more of the following aspects:
- the gas separation membranes of the first stage are also selective for $H_2S$ and $CO_2$ over methane and their $C_{3+}$/methane selectivity is higher than their $CO_2$/methane selectivity.
- said system is aboard a floating production storage and offloading (FPSO) vessel.
- there is no dew pointing equipment in flow communication between the main compressor and the first stage.
- the gas separation membranes of the first stage are also selective for $H_2S$ and $CO_2$ over methane and their $C_{3+}$/methane selectivity is higher than their $CO_2$/methane selectivity.
- said system is aboard a floating production storage and offloading (FPSO) vessel.
- the point of use is a generator that combusts a fuel gas comprised of the second retentate.
- the dry injectate gas is injected into an oil formation, wherein the stream of crude oil is obtained from the oil formation.
- the compressed feed gas is not dew pointed prior to being separated by the first stage.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein:
FIG. 1 is a schematic of the inventive system and method.

DESCRIPTION OF PREFERRED EMBODIMENTS

As illustrated in FIG. 1, a stream of crude oil 1 from an oil formation (either subterranean or subsea) is fed to two or more phase separators 3 of a crude oil separation train where it is separated into a stream of water 5, a stream of non-stabilized unrefined oil 7, and a stream of main gas 9. Because the non-stabilized unrefined oil has dissolved $C_{1-5}$ hydrocarbons, the stream of non-stabilized unrefined oil 7 is fed to a vapor recovery unit (VRU) 11 where it is stabilized through a series of depressurization steps where the $C_{1-5}$ hydrocarbons are stripped from the liquid phase to produce a stream of stabilized unrefined oil 13 and a vapor stream 15.

Because the stream of main gas 9 contains valuable amounts of methane, it is compressed at a compressor 17 and the thus-compressed feed gas stream 19 is fed to a first gas separation membrane-based purification stage 21 for hydrocarbon dew pointing and dehydration. The first stage 21 includes gas separation modules in parallel or in series each of which includes a gas separation membrane that is selective for $C_{3+}$ hydrocarbons and water over methane. The first stage separates the compressed stream 19 into a first permeate gas stream 23 and a first retentate gas stream 25. The first permeate gas stream 23 is enriched in water, $CO_2$, and $C_{3+}$ hydrocarbons and deficient in methane in comparison to the feed gas stream 19. Conversely, the first retentate gas stream 25 is enriched in methane and deficient in water, $CO_2$, and $C_{3+}$ hydrocarbons in comparison to the feed gas stream 19. While the selectivity of the gas separation membranes of the first stage 21 result in not only removal of water and $C_{3+}$ hydrocarbons but also removal of $CO_2$, it should be noted that the $C_{3+}$ hydrocarbons/methane selectivity of the gas separation membranes of the first stage 21 is higher than its $CO_2$/methane selectivity.

The bulk of the $CO_2$ contained within the stream of main gas 9 is removed by the $CO_2$ removal membranes of the second gas separation membrane-based purification stage 27. This is accomplished by feeding the first retentate gas stream 25 to the second stage 27 for separation into a $CO_2$-enriched and methane-deficient second permeate gas stream 29 and a methane-enriched and $CO_2$-deficient second retentate gas stream.

The second retentate gas stream is received by a fuel gas conduit 31 that is adapted and configured to feed the second retentate gas to a point of use. For example, it may be used as a fuel gas by on-site generators co-located at the facility where the crude oil purification system is located. For example, for crude oil extracted from a subsea formation, the generators combusting the second retentate gas are generators aboard a FPSO. Alternatively, the second retentate gas stream may be fed by the fuel gas conduit 31 towards a floating liquefied natural gas vessel where it is liquefied and transported to shore.

The first permeate gas stream 23 and the vapor stream 15 are compressed together at compressor 33 causing amounts of water to be condensed and forms a biphasic stream of injectate comprised of at least $C_{3+}$ hydrocarbons enriched gas and condensed water 35. The biphasic stream 35 is separated at phase separator 37 into a waste water stream 39 and a stream of $C_{3+}$ enriched gas 41. The stream of $C_{3+}$ enriched gas 41 is fed to a dehydration apparatus 45 where amounts of water are removed. Typically, the dehydration apparatus is a molecular sieve, gas separation membrane, or triethylene glycol (TEG) solvent absorption system. The resultant stream of dry injectate gas 45 may optionally be combined with the second permeate gas stream 29 and the combined stream 47 fed to an injection system (not illustrated) for injecting into the oil formation from which the stream of crude oil 1 was extracted.

Because the non-insignificant amount of gas in the vapor stream 15 is not compressed at the main compressor 17 and treated along with the stream of main gas 9 as in conventional processes, an advantage of the invention is the reduction in size of the main compressor 17 and first stage 21 and any associated processing equipment. This leads to increased hydrocarbon content (HC) at the discharge of the Main A Compressor. Consequently, some HC Dew Point unit becomes necessary to manage HC dewpoint upstream of the $CO_2$ removal section. Perhaps more importantly, because the non-insignificant amount of gas in the vapor stream 15 is not compressed and treated along with the stream of main gas 9 as in conventional processes, another advantage of the invention is the significant reduction in compression energy consumed. Although this non-insignificant amount of gas might need to be compressed by the permeate compressor 33, the overall compression energy is much lower because the main compressor 17 compresses gas to a significantly higher pressure than does the permeate compressor 33.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within the range.

All references identified herein are each hereby incorporated by reference into this application in their entireties, as well as for the specific information for which each is cited.

What is claimed is:

1. A system for recovery of fuel gas from purification of crude oil, comprising:
   a crude oil separation train comprising, in flow order: i) one or more phase separators in series that are adapted and configured to separate a stream of crude oil into a stream of main gas comprising methane, $H_2S$, and $CO_2$, a water stream, and a stream of non-stabilized unrefined oil containing dissolved $C_{1-5}$ hydrocarbons, and ii) a vapor recovery unit adapted and configured to depressurize and separate the stream of non-stabilized unrefined oil into a stream of stabilized unrefined oil and a vapor stream comprising $C_{1-5}$ hydrocarbons;
   a main compressor in downstream flow communication with the train and being adapted and configured to receive and compress the stream of main gas but not the vapor stream to produce a compressed feed gas;
   a first gas separation membrane-based purification stage comprising gas separation membrane modules in parallel and/or in series each of which comprises a gas separation membrane that is selective for $C_{3+}$ hydrocarbons and water over methane, the first stage being adapted and configured to receive and separate the compressed feed gas into a first permeate gas enriched in methane in comparison to the compressed feed gas and a first retentate gas enriched in $C_{3+}$ hydrocarbons and water in comparison to the compressed feed gas;
   a second gas separation membrane-based purification stage comprising gas separation membrane modules in parallel and/or in series each of which comprises a gas separation membrane that is selective for $CO_2$ over methane, said second stage being adapted and configured to receive and separate the first retentate gas into a second permeate gas and a second retentate gas;
   a fuel gas feed conduit adapted and configured to receive and feed the second retentate gas to a point of use;
   a secondary compressor adapted and configured to receive and compress the first permeate gas stream along with the vapor stream to produce a biphasic stream of injectate comprising $C_{3+}$ hydrocarbons enriched gas and condensed water;
   a phase separator adapted and configured to receive and separate the biphasic stream of injectate into a stream of condensed water and a stream of $C_{3+}$ hydrocarbon enriched gas; and
   a dehydration apparatus adapted and configured to remove amounts of water from the stream of $C_{3+}$ hydrocarbons enriched gas to produce a stream of dry injectate gas, the dehydration apparatus comprising a molecular sieve, a gas separation membrane selective for water over $C_{3+}$ hydrocarbons, or a triethylene glycol dehydration system.

2. The system of claim 1, wherein the gas separation membranes of the first stage are also selective for $H_2S$ and $CO_2$ over methane and their $C_{3+}$/methane selectivity is higher than their $CO_2$/methane selectivity.

3. The system of claim 1, wherein said system is aboard a floating production storage and offloading (FPSO) vessel.

4. The system of claim 1, wherein there is no dew pointing equipment in flow communication between the main compressor and the first stage.

5. A method for recovery of fuel gas from purification of crude oil, comprising the steps of:
   providing a crude oil separation train that comprises, in flow order, one or more phase separators in series and a vapor recovery unit;
   separating a stream of crude oil with the one or more phase separators into a stream of main gas comprising methane, $H_2S$, and $CO_2$, a stream of water, and a stream of non-stabilized unrefined oil containing dissolved $C_{1-5}$ hydrocarbons
   depressurizing and separating, with the vapor recovery unit, the stream of non-stabilized unrefined oil into a stream of stabilized unrefined oil and a vapor stream comprising $C_{1-5}$ hydrocarbons;
   compressing the stream of main gas but not the vapor stream to produce a compressed feed gas;
   separating, with a first gas separation membrane-based purification stage comprising gas separation membrane modules in parallel and/or in series each of which comprises a gas separation membrane that is selective for $C_{3+}$ hydrocarbons and water over methane, the compressed feed gas into a first permeate gas stream enriched in methane in comparison to the compressed feed gas and a first retentate gas stream enriched in $C_{3+}$ hydrocarbons and water in comparison to the compressed feed gas;

separating, with a second gas separation membrane-based purification stage comprising gas separation membrane modules in parallel and/or in series each of which comprises a gas separation membrane that is selective for $CO_2$ over methane, the first retentate gas stream into a second permeate gas stream and a second retentate gas stream;

feeding, with a fuel gas feed conduit, the second retentate gas to a point of use;

compressing, with a secondary compressor, the first permeate gas stream along with the vapor stream to produce a biphasic stream of injectate comprising $C_{3+}$ hydrocarbon enriched gas and condensed water;

separating, with a phase separator adapted and configured to receive and separate the biphasic stream of injectate into a stream of condensed water and a stream of $C_{3+}$ hydrocarbon enriched gas; and removing amounts of water from the stream of $C_{3+}$ hydrocarbons enriched gas with a dehydration apparatus to produce a stream of dry injectate gas, the dehydration apparatus comprising a molecular sieve or a gas separation membrane selective for water over $C_{3+}$ hydrocarbons.

6. The method of claim 5, wherein the gas separation membranes of the first stage are also selective for $H_2S$ and $CO_2$ over methane and their $C_{3+}$/methane selectivity is higher than their $CO_2$/methane selectivity.

7. The method of claim 5, wherein the method is performed aboard a floating production storage and offloading (FPSO) vessel.

8. The method of claim 5, wherein the point of use is a generator that combusts a fuel gas comprised of the second retentate.

9. The method of claim 5, further comprising a step of injecting the dry injectate gas into an oil formation, wherein the stream of crude oil is obtained from the oil formation.

10. The method of claim 5, wherein the compressed feed gas is not dew pointed prior to being separated by the first stage.

\* \* \* \* \*